United States Patent [19]

Tacke et al.

[11] Patent Number: 5,134,195
[45] Date of Patent: * Jul. 28, 1992

[54] TERNARY THERMOPLASTIC MIXTURES

[75] Inventors: Peter Tacke; Werner Nouvertné; Franz-Josef Gielen; Dieter Freitag, all of Krefeld; Ulrich Grigo, Kempen; Uwe Westeppe, Mettmann, all of Fed. Rep. of Germany

[73] Assignee: Bayer Aktiengesellschaft, Fed. Rep. of Germany

[*] Notice: The portion of the term of this patent subsequent to Apr. 14, 2009 has been disclaimed.

[21] Appl. No.: 559,812

[22] Filed: Jul. 30, 1990

[30] Foreign Application Priority Data

Aug. 3, 1989 [DE] Fed. Rep. of Germany ....... 3925635

[51] Int. Cl.$^5$ ...................... C08L 67/00; C08L 75/06; C08L 75/08
[52] U.S. Cl. ......................... 525/66; 525/67; 525/453; 525/454; 525/460
[58] Field of Search ................... 528/196; 525/66, 67, 525/454, 453, 460

[56] References Cited

U.S. PATENT DOCUMENTS 4,368,315 1/1983 Sikdar ................... 528/198
4,743,650 5/1988 Boutni ................... 525/92
4,929,674 5/1990 Nouvertné ............ 525/67
4,982,014 1/1991 Freitag ................ 528/196

FOREIGN PATENT DOCUMENTS 104695 4/1984 European Pat. Off. .
207327 1/1987 European Pat. Off. .
359953 3/1990 European Pat. Off. .
362646 4/1990 European Pat. Off. .
3833953 4/1990 Fed. Rep. of Germany .

Primary Examiner—James J. Seidleck
Assistant Examiner—David Buttner
Attorney, Agent, or Firm—Joseph C. Gil; Aron Preis

[57] ABSTRACT

The invention relates to ternary thermoplastic mixtures of polycarbonates, polyurethanes and graft polymers and, optionally, standard additives and to processes for the production of these mixtures.

1 Claim, No Drawings

TERNARY THERMOPLASTIC MIXTURES

German patent application P 38 33 953.6 (Le A 26 397) relates to mixtures of a) special new polycarbonates with b) elastomers or with other thermoplastics than the special new polycarbonates of component a) and, optionally, c) standard additives and to processes for the production of these mixtures.

Particulars can be found in the text of this German patent application P 38 33 953.6 as reproduced on pages 1 to 36 of the present application:

The invention according to German patent application P 38 33 953.6 relates to mixtures containing a) thermoplastic polycarbonates based on diphenols corresponding to formula (I)

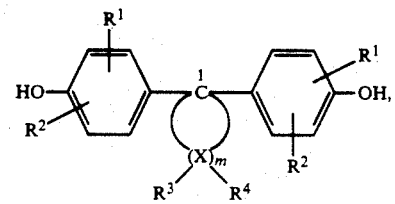

in which

R$^1$ and R$^1$ independently of one another represent hydrogen, halogen, C$_1$–C$_8$ alkyl, C$_5$–C$_6$ cycloalkyl, C$_6$–C$_{10}$ aryl and C$_7$–C$_{12}$ aralkyl, m is an integer of from 4 to 7, R$^3$ and R$^4$ may be individually selected for each X and independently of one another represent hydrogen or C$_1$–C$_6$ alkyl and X represents carbon, with the proviso that, at at least one atom X, both R$^3$ and R$^4$ are alkyl, and b) elastomers or other thermoplastics than those of component a) and, optionally, c) standard additives, and to processes for their production.

German patent application P 3 832 396.6 (Le A 26 344) describes the polycarbonates (a) of the mixtures according to the invention and also their starting products and their production.

Starting products for the polycarbonates (a) are dihydroxydiphenyl cycloalkanes corresponding to formula (I)

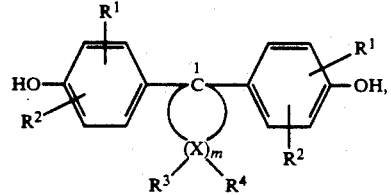

in which

R$^1$ and R$^2$ independently of one another represent hydrogen, halogen, preferably chlorine or bromine, C$_1$–C$_8$ alkyl, C$_5$–C$_6$ cycloalkyl, C$_6$–C$_{10}$ aryl, preferably phenyl, and C$_7$–C$_{12}$ aralkyl, preferably phenyl-C$_1$–C$_4$-alkyl, more particularly benzyl, m is an integer of from 4 to 7, preferably 4 or 5, R$^3$ and R$^4$, may be individually selected for each X and, independently of one another represent hydrogen or C$_1$–C$_6$ alkyl and X represents carbon, with the proviso that, at at least one atom X, both R$^3$ and R$^4$ are alkyl.

Preferably at 1 to 2 atoms X and, more particularly, at only 1 atom X, both R$^3$ and R$^4$ are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Preferred dihydroxydiphenyl cycloalkanes are those containing 5 and 6 ring C atoms in the cycloaliphatic radical (m=4 or 5 in formula (I)), for example diphenols corresponding to the following formulae

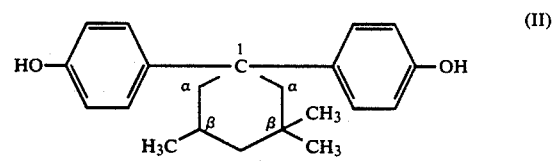

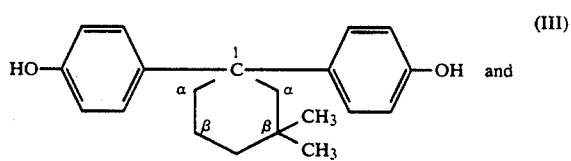

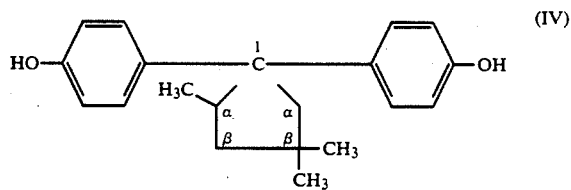

the 1,1-bis-(4-hydroxyphenyl)-3,3,5-trimethyl cyclohexane (formula II) being particularly preferred.

The dihydroxydiphenyl cycloalkanes corresponding to formula (I) may be obtained in known manner by condensation of phenols corresponding to formula (V)

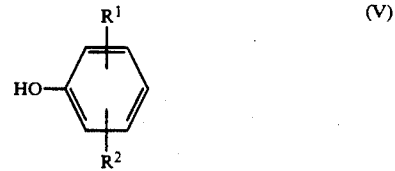

and ketones corresponding to formula (VI)

where X, R$^1$, R$^2$, R$^3$, R$^4$ and m are as defined for formula (I).

The phenols corresponding to formula (V) are either known from the literature or may be obtained by methods known from the literature (for cresols and xylenols, see for example Ullmanns Encyklopädie der technischen Chemie, 4th Revised and Extended edition, Vol. 15, pages 61–77, Verlag Chemie, Weinheim/N.Y., 1978; for chlorophenols, Ullmanns Encyklopädie der technischen Chemie, 4th Edition, Verlag Chemie, 1975, Vol. 9, pages 573-582; and for alkylphenols, Ullmanns Encyklopädie der technischen Chemie, 4th Edition, Verlag Chemie 1979, Vol. 18, pages 191-214).

Examples of suitable phenols corresponding to formula (V) are phenol, o-cresol, m-cresol, 2,6-dimethylphenol, 2-chlorophenol, 3-chlorophenol, 2,6-dichlorophenol, 2-cyclohexylphenol, phenylphenols and o-benzylphenol.

The ketones corresponding to formula (VI) are known from the literature (cf. for example Beilsteins Handbuch der Organischen Chemie, Vol. 7, 4th Edition, Springer-Verlag, Berlin, 1925 and the corresponding Supplementary Volumes 1 to 4 and J. Am. Chem. Soc. Vol. 79 (1957), pages r 1488, 1490 and 1491, US-PS 2,692,289, Allen et al, J. Chem. Soc., (1954), 2186, 2191 and J. Org. Chem. Vol. 38, no. 26, (1973), pages 4431 et sec, J. Am. Chem. Soc. 87, (1965), pages 1353 et seq, more especially page 1355). A general process for the production of ketones corresponding to formula (VI) is described, for example in "Organikum", 15th Edition, 1977, VEB-Deutscher Verlag der Wissenschaften, Berlin, for example on page 698.

The following are examples of known ketones corresponding to formula (VI): 3,3-dimethylcyclopentanone, 2,2-dimethylcyclohexanone, 3,3-dimethylcyclohexanone, 4,4-dimethylcyclohexanone, 3-ethyl-3-methylcyclopentanone, 2,3,3-trimethylcyclopentanone, 2,4,4-trimethylcyclopentanone, 3,3,4-trimethylcyclopentanone, 3,3-dimethylcycloheptanone 4,4-dimethylcycloheptanone, 3-ethyl-3-methylcyclohexanone, 4-ethyl-4-methylcyclohexanone, 2,3,3-trimethylcyclohexanone, 2,4,4-trimethylcyclohexanone, 3,3,4-trimethylcyclohexanone, 2,5,5-trimethylcyclohexanone, 3,3,5-trimethylcyclohexanone,3,4,4-trimethylcyclohexanone, 2,3,3,4-tetramethylcyclopentanone, 2,3,4,4-tetramethylcyclopentanone, 3,3,4,4-tetramethylcyclopentanone, 2,2,5-trimethylcycloheptanone, 2,2,6-trimethylcycloheptanone, 2,6,6-trimethylcyclcheptanone, 3,3,5-trimethylcycloheptanone,3,5,5-trimethylcycloheptanone, 5-ethyl-2,5-dimethylcycloheptanone, 2,3,3,5-tetramethylcycloheptanone, 2,3,5,5-tetramethylcycloheptanone, 3,3,5,5-tetramethylcycloheptanone, 4-ethyl-2,3,4-trimethylcyclopentanone, 2-isopropyl-4,4-dimethylcyclopentanone, 4-isopropyl-2,4-dimethylcyclopentanone, 2-ethyl-3,5,5-trimethylcyclohexanone, 3-ethyl-3,5,5-trimethylcyclohexanone,3-ethyl-4-isopropyl-3-methylcyclopentanone, 4-sec.-butyl-3,3-dimethylcyclopentanone,2-isopropyl-3,3,4-trimethylcyclopentanone, 3-ethyl-4-isopropyl-3-methyl-cyclohexanone, 4-ethyl-3-isopropyl-4-methylcyclohexanone, 3-sec.-butyl-4,4-dimethylcyclohexanone, 3-isopropyl-3,5,5-trimethylcyclohexanone, 4-isopropyl-3,5,5-trimethylcyclohexanone, 3,3,5-trimethyl-5-propylcyclohexanone, 3,5,5-trimethyl-5-propylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone, 5-ethyl-2,4-diisopropyl-5-methylcyclohexanone, 2,2-dimethylcyclooctanone and 3,3,8-trimethylcyclooctanone.

The following are examples of preferred ketones:

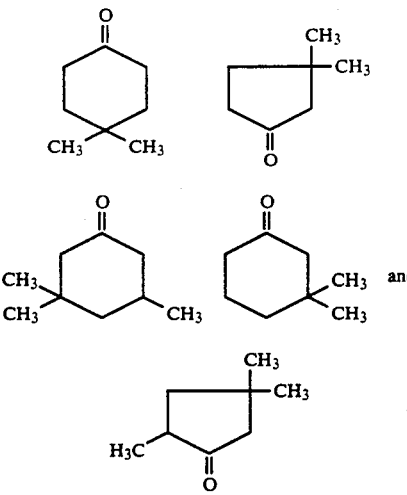

To prepare the bisphenols, the phenol (V) is generally used in a quantity of 2 to 10 mol and preferably in a quantity of 2.5 to 6 mol per mol ketone (VI). Preferred reaction times are from 1 to 100 hours. The reaction is generally carried out at a temperature in the range from −30° C. to 300° C. and preferably at a temperature in the range from −15° C. to 150° C. and under a pressure of from 1 to 20 bar and preferably under a pressure of from 1 to 10 bar.

The condensation is generally carried out in the presence of acidic catalysts such as, for example, hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric acid or sulfuric acid and also mixtures of acetic acid and acetanhydride. Acidic ion exchangers may also be used.

In addition, the reaction may be accelerated by addition of co-catalysts, such as $C_1-C_{18}$ alkyl mercaptans, hydrogen sulfide, thiophenols, thio acids and dialkyl sulfides, preferably in quantities of from 0.01 to 0.4 mol per mol ketone and more preferably in quantities of from 0.05 to 0.2 mol per mol ketone.

The condensation may be carried out in the absence of solvents or in the presence of an inert solvent (for example an aliphatic or aromatic hydrocarbon, chlorinated hydrocarbon).

In cases where the catalyst also acts as a dehydrating agent, there is no need to use separate dehydrating agents, although, to obtain good conversions, it is always of advantage to use dehydrating agents when the catalyst used does not bind the water of reaction.

Suitable dehydrating agents are, for example, acetanhydride, zeolites, polyphosphoric acid and phosphorus pentoxide.

Phenol (V) and ketone (VI) may be reacted in a molar ratio of (V) to (VI) of from 2:1 to 10:1 and preferably from 2.5:1 to 6:1 at temperatures in the range from −30° C. to 300° C., preferably at temperatures in the range from −15° C. to 150° C. and under pressures of from 1 to 20 bar and preferably from 1 to 10 bar in the presence of acidic catalysts and optionally in the presence of co-catalysts and/or solvents and/or dehydrating agents.

In formula (I), $R^3$ and $R^4$ are both alkyl at preferably 1 to 2 atoms X, but more especially at only 1 atom X.

The preferred alkyl radical is methyl, although ethyl or linear or branched $C_3$-$C_6$ alkyl radicals may also be used. The X atoms in the o-position to the diphenyl-substituted C atom (C-1) are preferably not dialkyl-substituted, whereas the X atoms in the β-position to C-1 are preferably dialkyl-substituted.

In some cases, the reaction is not entirely uniform, i.e. several different products can be formed, so that the desired compound first has to be isolated from a mixture. For particulars of the condensation, reference may be made to Schnell, Chemistry and Physics of Polycarbonates, Interscience Publishers, N.Y. 1964. In some cases, it is possible to control the reaction through the choice of suitable catalysts and reaction conditions in such a way that the desired compound precipitates or crystallizes out, which makes it easier to isolate. The preparation of the diphenol corresponding to formula (II) is described in the following:

EXAMPLE A 7.5 mol (705 g) phenol and 0.15 mol (30.3 g) dodecylthiol are introduced into a 1-liter round-bottomed flask equipped with a stirrer, dropping funnel, thermometer, reflux condenser and gas inlet pipe and saturated with dry HCl gas at 28 to 30 C. A solution of 1.5 mol (210 g) dihydroisophorone (3,3,5-trimethylcyclohexan-1-one) and 1.5 mol (151 g) phenol is added dropwise to the resulting solution over a period of 3 hours, HCl gas continuing to be passed through the reaction solution. After the addition, HCl gas is introduced for another 5 hours. The mixture is then left to react for 8 hours at room temperature. The excess phenol is then removed by steam distillation. The residue is hot-extracted twice with petroleum ether (60–90) and once with methylene chloride and filtered off. Yield: 370 g, Mp.: 205°–207° C.

The polycarbonates (a) may be prepared from diphenols corresponding to formula (I) in accordance with German patent application P 38 32 396.6.

It is possible to use both a single diphenol corresponding to formula (I), in which case homopolycarbonates are formed, and also several diphenols corresponding to formula (I), in which case copolycarbonates are formed.

In addition, the diphenols corresponding to formula (I) may also be used in admixture with other diphenols, for example with those corresponding to the formula HO—Z—OH (VII), for the production of high molecular weight, thermoplastic aromatic polycarbonates.

Suitable other diphenols corresponding to the formula HO—Z—OH (VII) are those in which Z is an aromatic radical containing 6° to 30° C. atoms which may contain one or more aromatic nuclei, may be substituted and may contain aliphatic radicals or other cycloaliphatic radicals than those corresponding to formula (I) or heteroatoms as bridge members.

Examples of diphenols corresponding to formula (VII) are hydroquinone, resorcinol, dihydroxydiphenyls, bis-hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α,-bis-(hydroxyphenyl)-diisopropylbenzenes and nucleus-alkylated and nucleus-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 0956, in FR-PS 561 518 and in the book by H. Schnell entitled "Chemistry and Physics of Polycarbonates", Interscience Publishers, N.Y., 1964.

Preferred other diphenols are, for example, 4,4,-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α,-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α,-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols corresponding to formula (VII) are, for example, 2,2-bis-(4-hydroxyphenyl)propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane is particularly preferred.

The other diphenols may be used both individually and in admixture with one another.

The molar ratio of diphenols corresponding to formula (I) to the other diphenols optionally used, for example those corresponding to formula (VII), should be between 100 mol-% (I) to 0 mol-% other diphenol and 2 mol-% (I) to 98 mol-% other diphenol, preferably between 100 mol-% (I) to 0 mol-% other diphenol and 5 mol-% (I) to 95 mol-% other diphenol and, more preferably, between 100 mol-% (I) to 0 mol-% other diphenol and 10 mol-% (I) to 90 mol-% other diphenol and, most preferably, between 100 mol-% (I) to 0 mol-% other diphenol and 20 mol-% (I) to 80 mol-% other diphenol.

The high molecular weight polycarbonates of the diphenols corresponding to formula (I), optionally in combination with other diphenols, may be prepared by any of the known methods used to produce polycarbonates. The various diphenols may be attached to one another both statistically and also in blocks.

The polycarbonates may be branched in known manner. If branching is required, it may be achieved in known manner by co-condensation of small quantities, preferably of from 0.05 to 2.0 mol-% (based on diphenols used), of trifunctional or more than trifunctional compounds, particularly those containing three or more than three phenolic hydroxyl groups. Branching agents containing three or more than three phenolic hydroxyl groups include phloroglucinol, 4,6-dimethyl-2,4,6-tri-(4-hydroxyphenyl)-hept-2-ene, 4,6-dimethyl-2,4,6-tri-(4-hydroxyphenyl)-heptane,1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5,-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds may be used in the usual concentrations as chain terminators for regulating the molecular weight of the polycarbonates (a) in known manner. Suitable compounds are, for example, phenol, tert.-butylphenols or other alkyl-$C_1$–$C_7$-substituted phenols. Small quantities of phenols corresponding to formula (VIII)

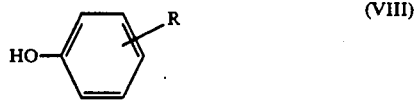

in which R is a branched $C_8$ and/or $C_9$ alkyl radical, are particularly suitable for regulating molecular weight. In the alkyl radical R, the percentage of $CH_3$ protons is between 47 and 89% and the percentage of CH and $CH_2$ protons between 53 and 11%. R is preferably in the o- and/or p-position to the OH group, 20% being the particularly preferred upper limit to the ortho component. The chain terminators are generally used in quantities of from 0.5 to 10 mol-% and preferably in quantities of from 1.5 to 8 mol-%, based on the diphenols used.

The polycarbonates (a) may be produced in known manner, preferably by the interfacial process (cf. H. Schnell "Chemistry and Physics of Polycarbonates", Polymer Reviews, Vol. IX, pages 33 et seq. Interscience Publ., 1964). In this process, the diphenols corresponding to formula (I) are dissolved in aqueous alkaline phase. To prepare copolycarbonates with other diphenols, mixtures of diphenols corresponding to formula (I) and the other diphenols, for example those corresponding to formula (VII), are used. Chain terminators, for example corresponding to formula (VIII), may be added to regulate molecular weight. The reaction is then carried out with phosgene by the interfacial condensation method in the presence of an inert, preferably polycarbonate-dissolving, organic phase. The reaction temperature is in the range from 0° to 40° C.

The branching agents optionally used (preferably 0.05 to 2 mol-%) may be initially introduced either with the diphenols in the aqueous alkaline phase or may be added in solution in the organic solvent before the phosgenation.

In addition to the diphenols of formula (I) and, optionally, other diphenols (VII), mono- and/or bis-chlorocarbonic acid esters thereof may also be used, being added in solution in organic solvents. The quantity of chain terminators and branching agents used is then determined by the molar quantity of diphenolate residues corresponding to formula (I) and, optionally, formula (VII). Where chlorocarbonic acid esters are used, the quantity of phosgene may be reduced accordingly in known manner.

Suitable organic solvents for the chain terminators and, optionally, for the branching agents and the chlorocarbonic acid esters are, for example, methylene chloride, chlorobenzene, acetone, acetonitrile and mixtures of these solvents, particularly mixtures of methylene chloride and chlorobenzene. The chain terminators and branching agents used may optionally be dissolved in the same solvent.

The organic phase for the interfacial polycondensation may be formed, for example, by methylene chloride, chlorobenzene and by mixtures of methylene chloride and chlorobenzene.

Aqueous NaOH solution for example is used as the aqueous alkaline phase.

The production of the polycarbonates (a) by the interfacial process may be catalyzed in the usual way by such catalysts as tertiary amines, particularly tertiary aliphatic amines, such as tributylamine or triethylamine. The catalysts may be used in quantities of from 0.05 to 10 mol-%, based on mols diphenols used. The catalysts may be added before the beginning of phosgenation or during or even after phosgenation.

The polycarbonates (a) may also be produced by the known homogeneous-phase process, the so-called "pyridine process" and also by the known melt transesterification process using diphenyl carbonate for example instead of phosgene.

The polycarbonates (a) preferably have molecular weights $\overline{M}w$ (weight average, as determined by gel chromatography after preliminary calibration) of at least 10,000 and, more preferably, in the range from 10,000 to 300,000 and, for injection-molding purposes, in the range from 20,000 to 80,000. They may be linear or branched and are homopolycarbonates or copolycarbonates based on the diphenols corresponding to formula (I).

Accordingly, polycarbonates (a) in the context of the invention are high molecular weight, thermoplastic, aromatic polycarbonates having $\overline{M}w$ values (weight average molecular weights) of at least 10,000, preferably in the range from 10,000 to 200,000 and more preferably in the range from 20,000 to 80,000 which contain bifunctional carbonate structural units corresponding to formula (Ia)

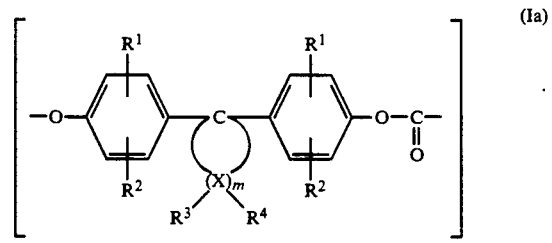

in which X, $R^1$, $R^2$, $R^3$, R 4 and m are as defined for formula (I), in quantities of from 100 mol-% to 2 mol-%, preferably in quantities of from 100 mol-% to 5 mol-%, more preferably in quantities of from 100 mol-% to 10 mol-% and, most preferably, in quantities of from 100 mol-% to 20 mol-%, based in each case on the total quantity of 100 mol-% of difunctional carbonate structural units in the polycarbonate.

Accordingly, the polycarbonates contain quantities—complementary in each case to 100 mol-%—of other difunctional carbonate structural units, for example those corresponding to formula (VIIa)

i.e. in quantities of from 0 mol-% (inclusive) to 98 mol-% inclusive, preferably from 0 mol-% to 95 mol-%, more preferably from 0 mol-% to 90 mol-% and most preferably from 0 mol-% to 80 mol-%, based in each case on the total quantity of 100 mol-% of difunctional carbonate structural units in the polycarbonate. [-Z- in formula (VIIa) corresponds to the -Z- in formula (VII)].

New polycarbonates which combine high heat resistance with other favorable properties are obtained through the incorporation of the diphenols corresponding to formula (I). This applies in particular to the polycarbonates based on the diphenols (I), in which m is 4 or 5, and more particularly to the polycarbonates based on diphenols corresponding to formula (Ib)

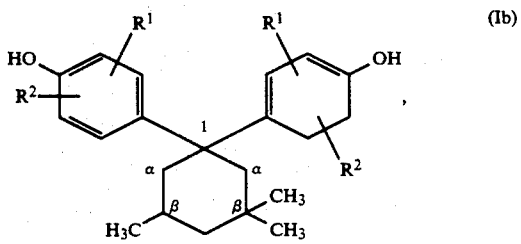
(Ib)

in which $R^1$ and $R^2$ independently of one another have the meaning defined for formula (I) and, more preferably, represent hydrogen.

The preferred polycarbonates (a) are those in which, in the structural units corresponding to formula (Ia), m is 4 or 5, and more especially those of units corresponding to formula (Ic)

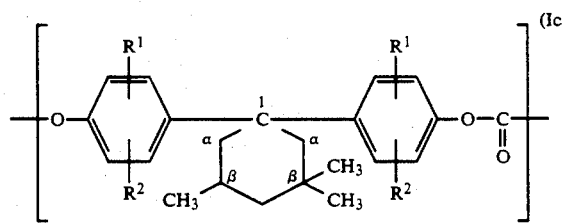
(Ic)

in which $R^1$ and $R^2$ are as defined for formula (Ia), but are preferably hydrogen.

In addition, these polycarbonates based on the diphenols corresponding to formula (Ib), in which $R^1$ and $R^2$ are preferably hydrogen, unexpectedly show high UV stability and good flow behavior in the melt in addition to their high heat resistance.

In addition, the properties of the polycarbonates may be varied with advantage through their combination with other diphenols, particularly with the diphenols corresponding to formula (VII).

Examples B.1 to B.5 below describe the production of polycarbonates (a). The relative viscosity was measured on 0.5% by weight solutions of the polycarbonates in $CH_2Cl_2$.

The glass temperature was measured by differential scanning calorimetry (DSC).

EXAMPLE B.1

31.0 g (0.1 mol) of the diphenol of formula (II), 33.6 g (0.6 mol) KOH and 560 g water are dissolved while stirring in an inert gas atmosphere. A solution of 0.188 g phenol in 560 ml methylene chloride is then added. 19.8 g (0.2 mol) phosgene were introduced into the thoroughly stirred solution at pH 13 to 14 and at 21 to 25 C. 0.1 ml ethyl pyridine is then added, followed by stirring for 45 minutes. The bisphenolate-free aqueous phase is separated off, the organic phase is washed with water until neutral after acidification with phosphoric acid and is freed from the solvent. The polycarbonate had a relative solution viscosity of 1.259.

The glass temperature of the polymer was found to be 233° C. (DSC).

EXAMPLE B.2

68.4 g (0.3 mol) bisphenol A (2,2-bis-(4-hydroxyphenyl)-propane, 217.0 g (0.7 mol) diphenol corresponding to formula (II), 336.6 g (6 mol) KOH and 2700 g water are dissolved with stirring in an inert gas atmosphere. A solution of 1.88 g phenol in 2500 ml methylene chloride is then added. 198 g (2 mol) phosgene were introduced into the thoroughly stirred solution at pH 13 to 14 and at 21 to 25° C. 1 ml ethyl piperidine is then added, followed by stirring for 45 minutes. The bisphenolate-free aqueous phase is separated off, the organic phase is washed with water until neutral after acidification with phosphoric acid and is freed from the solvent. The polycarbonate had a relative viscosity of 1.336.

The glass temperature of the polymer was found to be 212° C. (DSC).

EXAMPLE B.3

A mixture of 114 g (0.5 mol) bisphenol A and 155 g (0.5 mol) of the diphenol (II) was reacted as in Example B.2 to form the polycarbonate.

The polycarbonate had a relative solution viscosity of 1.386.

The glass temperature of the polymer was found to be 195° C. (DSC).

EXAMPLE B.4

A mixture of 159.6 g (0.7 mol) bisphenol A and 93 g (0.3 mol) of diphenol (II) was reacted as in Example B.2 to form the polycarbonate.

The polycarbonate had a relative solution viscosity of 1.437.

The glass temperature of the polymer was found to be 180° C. (DSC).

EXAMPLE B.5

31.0 g (0.1 mol) of the diphenol of formula (II), 24.0 g (0.6 mol) NaOH and 270 g water are dissolved with stirring in an inert gas atmosphere. A solution of 0.309 g 4-(1,1,3,3-tetramethylbutyl)-phenol in 250 ml methylene chloride is then added. 19.8 g (0.2 mol) phosgene were introduced into the thoroughly stirred solution at pH 13 to 14 and at 21 to 25 ° C. 0.1 ml ethyl piperidine is then added, followed by stirring for 45 minutes. The bisphenolate-free aqueous phase is separated off, the organic phase is washed with water until neutral after acidification with phosphoric acid and is freed from the solvent. The polycarbonate had a relative solution viscosity of 1.314.

The glass temperature of the polymer was found to be 234° C. (DSC).

To assess the UV stability of the new polycarbonates, the formation of primary radicals under UV irradiation with a mercury vapor lamp (edge filter 305 nm) was determined in comparison with a polycarbonate based on 2,2-bis-(4-hydroxyphenyl)-propane. It was found that the polycarbonate of Example B.1 shows a lower primary radical formation rate and, therefore, higher UV stability.

The invention according to German patent application P 38 33 953.6 relates to mixtures containing a) from 0.1% by weight to 99.9% by weight, preferably from 1% by weight to 98% by weight and more preferably from 2.5% by weight to 90% by weight of high molecular weight, thermoplastic, aromatic polycarbonates having $\overline{M}w$ values (weight average molecular weights) of at least 10,000, preferably from 10,000 to 200,000 and, for injection molding purposes, from 20,000 to 80,000 which contain bifunctional carbonate structural units corresponding to formula (Ia).

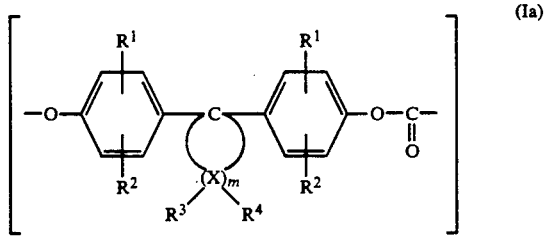

in which X, $R^1$, $R^2$, $R^3$, $R^4$ and m are as defined for formula (I), in quantities of from 100 mol-% to 2 mol-%, preferably in quantities of from 100 mol-% to 5 mol-%, more preferably in quantities of from 100 mol-% to 10 mol-% and, most preferably, in quantities of from 100 mol-% to 20 mol-% in addition to the quantity—complementary to 100 mol-%—of other difunctional carbonate structural units, b) from 99.9% by weight to 0.1% by weight, preferably from 99% by weight to 2% by weight and more preferably from 97.5% by weight to 10% by weight of elastomers or other thermoplastics than the polycarbonates of component a), the sum of a)+b) being 100% by weight.

Particularly suitable polycarbonates (a) are those in which, in the structural units corresponding to formula (Ia), m is 4 or 5, more especially those containing structural units corresponding to formula (Ic)

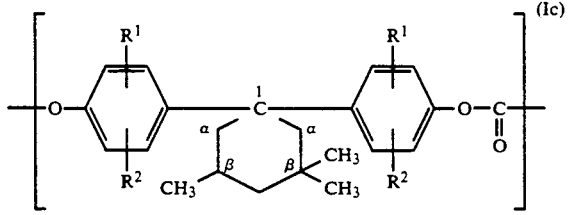

in which $R^1$ and $R^2$ are as defined for formula (Ia), but are preferably hydrogen.

Other thermoplastics suitable as component (b) in the mixtures according to the invention are both b1) amorphous thermoplastics, preferably those having a glass temperature of more than 40° C. and more especially in the range from 60° C. to 220° C., and also b2) partially crystalline thermoplastics, preferably those having a melting temperature of more than 60° C. and more especially in the range from 80° C. to 400° C.

Elastomers for components b) of the mixtures according to the invention are b3) polymers which have a glass temperature below 0° C., preferably below −10° C. and more especially in the range from −15° C. to −140° C.

Examples of other amorphous thermoplastics b1) are amorphous polymers from the class of polycarbonates, polyamides, polyolefins, polysulfones, polyketones, thermoplastic vinyl polymers, such as polymethyl acrylates, or homopolymers of aromatic vinyl compounds, copolymers of aromatic vinyl compounds or graft polymers of vinyl monomers on rubbers, polyethers, polyimides and thermoplastic polyurethanes.

Examples of crystalline thermoplastics b2) are aliphatic polyesters, polyarylene sulfides and the partially crystalline representatives of the thermoplastics listed above under b1).

Examples of elastomers b3) are the various rubbers, such as ethylene-propylene rubber, polyisoprene, polychloroprene, polysiloxanes, atactic polypropylene, diene, olefin and acrylate rubbers and natural rubbers, styrene-butadiene block copolymers, copolymers of ethylene with vinyl acetate or with (meth)acrylates, elastic polyurethanes, unless listed as thermoplastics under b1) or b2), and elastic polycarbonate-polyether block copolymers.

Amorphous thermoplastics b1) are, in particular, other polycarbonates than those according to German patent application P 3 832 396.6. These other polycarbonates may be both homopolycarbonates and also copolycarbonates and may be both linear and branched. The particularly preferred bisphenol for the other thermoplastic polycarbonates of component b) of the mixtures according to the invention is bisphenol A [=2,2-bis-(4-hydroxyphenyl)-propane].

These other thermoplastic polycarbonates are known.

The molecular weights $\overline{M}w$ (weight average molecular weight, as determined by gel permeation chromatography in tetrahydrofuran) of the other thermoplastic polycarbonates are in the range from 10,000 to 300,000 and preferably in the range from 12,000 to 150,000.

The other thermoplastic polycarbonates may be used both individually and in admixture for component b) of the mixtures according to the invention.

Preferred other thermoplastics for component b) for the production of the mixtures according to the invention are also aliphatic, thermoplastic polyesters, more preferably polyalkylene terephthalates, i.e. for example those based on ethylene glycol, propane-1,3-diol, butane-1,4-diol, hexane-1,6-diol and 1,4-bis-hydroxymethylcyclohexane, The molecular weights ($\overline{M}w$) of these polyalkylene terephthalates are in the range from 10,000 to 80,000. The a polyalkylene terephthalates may be obtained by known methods, for example from terephthalic acid dialkyl ester and the corresponding diol by transesterification (cf. for example U.S. Pat. Nos. 2,647,885, 2,643,989, 2,534,028, 2,578,660, 2,742,494, 2,901,466).

These polyesters are known. Preferred other thermoplastics also include thermoplastic polyamides.

Suitable thermoplastic polyamides are any partially crystalline polyamides, particularly polyamide-6, polyamide-6,6, and partially crystalline copolyamides based on these two components. Other suitable thermoplastic polyamides are partially crystalline polyamides of which the acid component consists completely or in part of, in particular, adipic acid or caprolactam or terephthalic acid and/or isophthalic acid and/or suberic acid and/or sebacic acid and/or azelaic acid and/or dodecane dicarboxylic acid and/or adipic acid and/or a cyclohexane dicarboxylic acid, and of which the diamine component consists completely or in part of, in particular, m- and/or p-xylylenediamine and/or hexamethylenediamine and/or 2,2,4- and/or 2,4,4-trimethyl hexamethylenediamine and/or isophoronediamine and of which the compositions are known in principle from the prior art (cf. for example Encyclopedia of Polymers, Vol. 11, pages 315 et seq.).

Other suitable thermoplastic polyamides are partially crystalline polyamides produced completely or in part from lactams containing 6 to 12 carbon atoms, optionally using one or more of the starting components mentioned above.

Particularly preferred partially crystalline polyamides are polyamide-6 and polyamide-6,6 or copolyamides containing a small amount (up to about 10% by weight) of other co-components. 35 Suitable polyamides are also amorphous polyamides obtained, for example, by polycondensation of diamines, such as for example hexamethylenediamines, decamethylenediamine, 2,2,4- and 2,4,4-trimethyl hexamethylenediamine, of 4,4,- and 2,2,-diaminodicyclohexyl methanes, 2,2-bis-(4-aminocyclohexyl)-propane, 3,3,-dimethyl-4,4,-diaminodicyclohexyl methane, 3-aminoethyl-3,5,5-trimethyl cyclohexyl amine, 2,5-bis-(aminomethyl)-norbornane, 2,6-bis-(aminomethyl)-norbornane, 1,4-diaminomethyl cyclohexane, and of mixtures of these diamines, with dicarboxylic acids, such as for example oxalic acid, adipic acid, azelaic acid, decane dicarboxylic acid, heptadecane dicarboxylic acid, 2,2,4-trimethyl adipic acid, 2,4,4-trimethyl adipic acid, isophthalic acid and terephthalic acid, and with mixtures of these dicarboxylic acids. Accordingly, amorphous copolyamides obtained by polycondensation of several of the diamines and/or dicarboxylic acids mentioned above are also included. Amorphous copolyamides prepared using ω-aminocarboxylic acids, such as ω-aminocaproic acid, ω-aminoundecanoic acid or ω-aminolauric acid, or lactams thereof, are also included.

Particularly suitable amorphous, thermoplastic polyamides are those obtainable from isophthalic acid, hexamethylenediamine and other diamines, such as 4,4,-diaminodicyclohexyl methane, isophoronediamine, 2,2,4- and 2,4,4-trimethyl hexamethylenediamine, 2,5- and/or 2,6-bis-(aminomethyl)-norbornane; those obtainable from isophthalic acid, 4,4,-diaminodicyclohexyl methane and ω-caprolactam; those obtainable from isophthalic acid, 3,3-dimethyl-4,4,-diaminodicyclohexyl methane and ω-lauric lactam; and those obtainable from terephthalic acid and the isomer mixture of 2,2,4- and 2,4,4-trimethyl hexamethylenediamine.

Instead of using pure 4,4,-diaminodicyclohexyl methane, it is also possible to use mixtures of the position-isomeric diaminodicyclohexyl methanes which consist of 70 to 99 mol-% of the 4,4'-diamino isomer,
1 to 30 mol-% of the 2,4'-diamino isomer,
0 to 2 mol-% of the 2,2'-diamino isomer
and, optionally, correspondingly more highly condensed diamines obtained by hydrogenation of diaminodiphenyl methane of technical quality.

Suitable thermoplastic polyamides may also consist of mixtures of partially crystalline and amorphous polyamides, the amorphous polyamide component being smaller than the partially crystalline polyamide component. The amorphous polyamides and their production are also know from the prior art (cf. for example Ullman, Enzyklopädie der technischen Chemie, Vol. 19, page 50).

Preferred other thermoplastics b) also include thermoplastic, linear or branched polyarylene sulfides. They have structural units corresponding to the following general formula

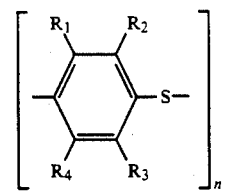

in which $R_1$ to $R_4$ may be independent or the same and represent $C_1-C_6$ alkyl, phenyl or hydrogen. The polyarylene sulfides may also contain diphenyl units.

Polyarylene sulfides and their production are known (see for example U.S. Pat. No. 3,354,129 and EP-OS 0 171 021).

Preferred other thermoplastics b) are thermoplastic polyarylene sulfones.

Suitable polyarylene sulfones have average weight average molecular weights $\overline{M}w$ (as measured by the scattered light method in $CHCl_3$) in the range from 1,000 to 200,000 and preferably in the range from 20,000 to 60,000. Examples are the polyarylene sulfones obtainable in known manner from 4,4,-dichlorodiphenyl sulfone and a bisphenol, particularly 2,2-bis-(4-hydroxyphenyl)-propane, which have average weight average molecular weights $\overline{M}w$ of from 2,000 to 200,000.

These polyarylene sulfones are known (cf. for example U.S. Pat. No. 3,264,536, DE-AS 1 794 171, GB-PS 1,264,900, U.S. Pat. No. 3,641,207, EP-A-0 038 028, DE-OS 3 601 419 and DE-OS 3 601 420). The suitable polyarylene sulfones may also be branched in known manner (cf. for example DE-OS 2 305 413).

Preferred other thermoplastics b) also include thermoplastic polyphenylene oxides, preferably poly-(2,6-dialkyl-1,4-phenylene oxides). Polyphenylene oxides suitable for the purposes of the invention have weight average molecular weights $\overline{M}w$ (as measured by the scattered light method in chloroform) of from 2,000 to 100,000 and preferably from 20,000 to 60,000. These polyphenylene oxides are known.

The preferred poly-(2,6-dialkyl-1,4-phenylene oxides) may be obtained in known manner by oxidizing condensation of 2,6-dialkylphenols with oxygen in the presence of catalyst combinations of copper salts and tertiary amines (see for example DE-OS 21 26 434 and U.S. Pat. No. 3,306,875).

Suitable poly-(2,6-dialkyl-1,4-phenylene oxides) are, in particular, the poly-[2,6-di-($C_1-C_4$-alkyl)-,1,4-phenylene oxides], such as for example poly-(2,6-dimethyl-1,4-phenylene oxide).

Preferred other thermoplastics b) also include aromatic polyether ketones (cf. for example GB-PS 1,078,234, U.S. Pat. No. 4,010,147 and EP-OS 0 135 938).

They contain the recurring structural element

—O—E—O—E'— in which —E'— is the residue of a bisaryl ketone having two bonds and —O—E—O— is a diphenolate residue having two bonds.

They may be obtained, for example, in accordance with GB-PS 1,078,234 from dialkali diphenolates having the formula alkali-0-E-0-alkali and bis-(haloaryl)-ketones having the formula hal-E,-hal (hal = halogen). One suitable dialkali diphenolate is, for example, that of 2,2-bis-(4-hydroxyphenyl)-propane, while a suitable bis-(haloaryl)ketone is 4,4,-dichlorobenzophenone.

Preferred other thermoplastics b) also include thermoplastic vinyl polymers.

Vinyl polymers in the context of the invention are homopolymers of vinyl compounds, copolymers of vinyl compounds and graft polymers of vinyl compounds on rubbers.

Homopolymers and copolymers suitable for the purposes of the invention are those of styrene, o-methyl styrene, acrylonitrile, methacrylonitrile, $C_1$–$C_{12}$ (cyclo)alkyl esters of (meth)acrylic acid, $C_1$–$C_4$ carboxylic acid vinyl esters, the copolymers also being obtainable from mixtures of these vinyl compounds by known methods.

The homopolymers or copolymers should have intrinsic viscosities of from 0.3 to 1.5 dl/g (as measured at 23° C. in toluene in known manner).

Suitable vinyl polymers are, for example, thermoplastic poly-$C_1$–$C_4$-alkyl methacrylates, for example those of methyl, ethyl, propyl or butyl methacrylate, preferably methyl or ethyl methacrylate. Both homopolymers and copolymers of these methacrylates are included. In addition, other ethylenically unsaturated, copolymerizable monomers, such as for example (meth)acrylonitrile, (α-methyl) styrene, bromostyrene, vinyl acetate, $C_1$–$C_6$ alkyl acrylate, (meth)acrylic acid, ethylene, propylene and N-vinyl pyrrolidone, may be copolymerized in small quantities.

The thermoplastic poly-$C_1$–$C_4$-alkyl methacrylates suitable for the purposes of the invention are known from the literature or may be obtained by methods known from the literature.

Suitable vinyl polymers also include copolymers of styrene or o-methyl styrene and acrylonitrile optionally containing up to 40% by weight of esters of acrylic or methacrylic acid, particularly methyl methacrylate or n-butyl acrylate. Styrene derivatives must always be present as monomers. The styrene derivatives are present in proportions of 100 to 10% by weight, preferably 90 to 20% by weight and more preferably 80 to 30% by weight and may be obtained by standard methods, such as radical polymerization in bulk, solution, suspension or emulsion, but preferably by radical emulsion polymerization in water.

Suitable graft polymers are formed by polymerization of the above-mentioned vinyl monomers or mixtures of vinyl monomers in the presence of rubbers having glass temperatures below 0 C. and preferably below −20° C. The graft polymers generally contain 1 to 85% by weight and preferably 10 to 80% by weight rubber. The graft polymers may be prepared by standard methods in solution, bulk or emulsion, preferably in emulsion; mixtures of vinyl monomers may be simultaneously or successively graft-polymerized.

Suitable rubbers are, preferably, diene rubbers and acrylate rubbers.

Diene rubbers are, for example, polybutadiene, polyisoprene and copolymers of butadiene with up to 35% by weight comonomers, such as styrene, acrylonitrile, methyl methacrylate and $C_1$–$C_6$ alkyl acrylates.

Acrylate rubbers are, for example, crosslinked, particulate emulsion polymers of $C_2$–$C_6$ alkyl acrylates, particularly $C_2$–$C_6$ alkyl acrylates, optionally in admixture with up to 15% by weight of other unsaturated monomers, such as styrene, methyl methacrylate, butadiene, vinyl methyl ether, acrylonitrile, and of at least one polyfunctional crosslinking agent, such as for example divinylbenzene, glycol-bis-acrylates, bis-acrylamides, phosphoric acid triallyl ester, citric acid triallyl ester, allyl esters of acrylic acid and methacrylic acid, triallyl isocyanurate, the acrylate rubbers containing up to 4% by weight of the crosslinking comonomers.

Mixtures of diene rubbers with acrylate rubbers and also rubbers having a core-shell structure are also suitable for the production of the graft polymers.

For graft polymerization, the rubbers must be present in the form of discrete particles, for example in the form of a latex. These particles generally have mean diameters of from 10 nm to 2000 nm.

The graft polymers may be produced by known methods, for example by radical emulsion graft polymerization of the vinyl monomers in the presence of rubber lattices at temperatures of from 50 to 90° C. using water-soluble initiators, such as peroxodisulfate, or redox initiators.

Emulsion graft polymers produced by radical graft polymerization onto particulate, highly crosslinked rubbers (diene or alkyl acrylate rubbers) having gel contents of more than 80% by weight and mean particle diameters ($d_{50}$) of from 80 to 800 nm are preferred.

Technical ABS polymers are particularly suitable.

Mixtures of vinyl homopolymers and/or vinyl copolymers with graft polymers are also suitable.

Preferred other thermoplastics b) also include thermoplastic polyurethanes. These are reaction products of diisocyanates, completely or predominantly aliphatic oligo- and/or polyesters and/or ethers and one or more chain-extending agents. These thermoplastic polyurethanes are substantially linear and have thermoplastic processing characteristics.

The thermoplastic polyurethanes are known or may be obtained by known methods (cf. for example U.S. Pat. No. 3,214,411; J. H. Saunders and K. C. Frisch, "Polyurethanes, Chemistry and Technology", Vol. II, pages 299 to 451, Interscience Publishers, N.Y., 1964; and Mobay Chemical Corporation "A Processing Handbook for Texin Urethane Elastoplastic Materials", Pittsburgh, Pa.).

Starting materials for the production of the oligoesters and polyesters are, for example, adipic acid, succinic acid, sebacic acid, suberic acid, oxalic acid, methyl adipic acid, glutaric acid, pimelic acid, azelaic acid, phthalic acid, terephthalic acid and isophthalic acid.

Adipic acid is preferred.

Suitable glycols for the production of the oligoesters and polyesters are, for example, ethylene glycol, 1,2- and 1,3-propylene glycol, butane-1,2-, -1,3-, -1,4-, -2,3- and -2,4-diol, hexanediol, bis-hydroxymethyl cyclohexane, diethylene glycol and 2,2-dimethyl propylene glycol. In addition, small quantities, i.e. up to 1 mol-%, of trihydric or higher alcohols, for example trimethylol propane, glycerol, hexanetriol etc., may be used together with the glycols.

The resulting hydroxyl oligoesters or polyesters have a molecular weight of at least 600, a hydroxyl value of from about 25 to 190 and preferably from about 40 to 150, an acid value of from about 0.5 to 2 and a water content of from about 0.01 to 0.2%.

Oligoesters and polyesters also include oligomeric or polymeric lactones, such as for example oligocaprolactone or polycaprolactone, and aliphatic polycarbonates, such as for example polybutane-1,4-diol carbonate or polyhexane-1,6-diol carbonate.

A particularly suitable oligoester which may be used as starting material for the thermoplastic polyurethanes is prepared from adipic acid and a glycol containing at least one primary hydroxyl group. The condensation is terminated when an acid value of 10 and preferably of about 0.5 to 2 is reached. The water formed during the reaction is thus separated off simultaneously or afterwards, so that the final water content is between about 0.01 and 0.05% and preferably between 0.01 and 0.02.

Oligoethers and polyethers for the production of the thermoplastic polyurethanes of component B) are, for example, those based on tetramethylene glycol, propylene glycol and ethylene glycol.

Polyacetals may also be regarded as polyethers and may be used as such.

The oligoethers or polyethers should have average molecular weights $\overline{M}n$ (number average determined via the OH value of the products) of from 600 to 2,000 and preferably from 1,000 to 2,000.

4,4'-Diphenyl methane diisocyanate is preferably used as the organic diisocyanate for the production of the polyurethanes of component B). It should contain less than 5% 2,4,-diphenyl methane diisocyanate and less than 2% of the dimer of diphenyl methane diisocyanate. In addition, the acidity, expressed as HCl, should be in the range from about 0.005 to 0.2%. The acidity expressed as % HCl is determined by extraction of the chloride from the isocyanate in hot, aqueous methanol solution or by liberation of the chloride during hydrolysis with water and titration of the extract with standard silver nitrate solution in order to obtain the concentration of chloride ions present therein.

It is also possible to use other diisocyanates for the production of the thermoplastic polyurethanes of component B), including for example the diisocyanates of ethylene, ethylidene, propylene, butylene, cyclo-1,3-pentylene, cyclo-1,4-hexylene, cyclo-1,2-hexylene, 2,4-tolylene, 2,6-tolylene, p-phenylene, n-phenylene, xylene, 1,4-naphthylene, 1,5-naphthylene, 4,4,-diphenylene; 2,2-diphenylpropane-4,4,-diisocyanate, azobenzene-4,4,-diisocyanate, diphenylsulfone-4,4,-diisocyanate, dichlorohexamethylene diisocyanate, pentamethylene diisocyanate, hexamethylene diisocyanate, 1-chlorobenzene-2,4-diisocyanate, furfuryl diisocyanate, dicyclohexyl methane diisocyanate, isophorone diisocyanate, diphenyl ethane diisocyanate and bis-(isocyanatophenyl)-ethers of ethylene glycol, butanediol, etc.

Suitable chain-extending agents are organic difunctional compounds containing active hydrogen reactive to isocyanates, for example diols, hydroxycarboxylic acids, dicarboxylic acids, diamines and alkanolamines and water. Examples of such chain-extending agents are, for example, ethylene, propylene and butylene glycol, butane-1,4-diol, butanediol, butynediol, xylylene glycol, amylene glycol, 1,4-phenylene-bis-$\beta$-hydroxyethyl ether, 1,3-phenylene-bis-$\beta$-hydroxyethyl ether, bis-(hydroxymethylcyclohexane), hexanediol, adipic acid, $\omega$-hydroxycaproic acid, thiodiglycol, ethylenediamine, propylene, butylene, hexamethylene, cyclohexylene, phenylene, tolylene and xylylenediamine, diaminodicyclohexyl methane, isophoronediamine, 3,3,-dichlorobenzidine, 3,3,-dinitrobenzidine, ethanolamine, aminopropyl alcohol, 2,2-dimethyl propanolamine, 3-aminocyclohexyl alcohol and p-aminobenzyl alcohol. The molar ratio of oligoester or polyester to bifunctional chain extender is in the range from 1:1 to 1:50 and preferably in the range from 1:2 to 1:30.

In addition to difunctional chain-extending agents, it is also possible to use trifunctional or more than trifunctional chain-extending agents in small quantities of up to about 5 mol-%, based on mols of difunctional chain-extending agents used.

Examples of trifunctional or more than trifunctional chain-extending agents are glycerol, trimethylol propane, hexanetriol, pentaerythritol and triethanolamine.

Monofunctional components, for example butanol, may also be used for the production of the thermoplastic polyurethanes.

The diisocyanates, oligoesters, polyesters, polyethers, chain-extending agents and monofunctional components mentioned as structural units for the thermoplastic polyurethanes are either known from the literature or may be obtained by methods known from the literature.

The known production of the polyurethanes may be carried out, for example, as follows:

For example, the oligoesters or polyesters, the organic diisocyanates and the chain-extending agents may be individually heated, preferably to a temperature of from about 50° to 220° C., and then mixed. The oligoesters or polyesters are preferably first individually heated, then mixed with the chain-extending agents and the resulting mixture mixed with the preheated isocyanate.

The starting components for the production of the polyurethanes may be mixed by any mechanical stirrer which provides for intensive mixing in a short time. If the viscosity of the mixture should prematurely rise too quickly during stirring, either the temperature may be lowered or a small quantity (0.001 to 0.05% by weight, based on ester) citric acid or the like may be added to reduce the reaction velocity. To increase the reaction velocity, suitable catalysts, such as for example the tertiary amines mentioned in U.S. Pat. No. 2,729,618, may be used.

Preferred elastomers b3) for component b) for the production of the mixtures according to the invention are the polyurethanes mentioned above, providing they are elastic, styrene-butadiene block copolymers which may be partially hydrogenated (for example Kraton G ®, a Shell product), the rubbers mentioned above for the graft polymers, the graft polymers themselves, providing they are elastic, and elastic polycarbonate-polyether block copolymers.

These elastomers are known.

The mixtures of the polycarbonates a) and the elastomers b3) may be prepared, for example, by mixing components a) and b3) in the melt in standard units, such as kneaders, single-screw or multiple-screw extruders or rolls.

The invention according to German patent application P 38 33 953.6 also relates to a process for the production of mixtures of 0.1 to 99.9% by weight, preferably 1 to 98% by weight and more preferably 2.5 to 90% by weight polycarbonate a) with 99.9 to 0.1% by weight, preferably 99 to 2% by weight and, more preferably, 97.5 to 10% by weight elastomer b3), characterized in that polycarbonate a) is melted and elastomer b3) is added and homogenized in the melt of the polycarbonate.

The mixtures of the polycarbonates a) and the other thermoplastics b1) or b2) may be prepared, for example, by mixing solutions of components a) and b) or by mixing the components in kneaders, on rolls or in single-screw or multiple-screw extruders.

The invention according to German patent application P 38 33 953.6 also relates to a process for the production of mixtures of 0.1 to 99.9% by weight, preferably 1 to 98% by weight and more preferably 2.5 to 90% by weight polycarbonate a) with 99.9 to 0.1% by weight, preferably 99 to 2% by weight and, more preferably, 97.5 to 10% by weight other thermoplastics b1) or b2), characterized in that all the components are mixed in the form of solutions and the resulting mixture is worked up in the usual way or all the components are mixed and homogenized in the melt.

The additives normally used for the components b), for example fillers and/or nucleating agents and/or fibers, may be added to the mixtures in the usual quantities as component c).

Inorganic fillers are, for example, ceramic fillers, such as aluminium nitrite, silicates, titanium dioxide, talcum, chalk, mica, carbon black; fibers are, for example, those of glass, carbon or of liquid-crystalline polymers.

Examples of nucleating agents are barium sulfate and $TiO_2$.

These additives may be added in the usual quantities to the components b) either before the preparation of the mixtures according to the invention or together with the polycarbonates of component a) or may be subsequently incorporated in the mixtures according to the invention of components a) and b).

Similarly, the additives mentioned may be added in the usual quantities to the polycarbonates of component a) before or during or after mixing with component b).

The mixtures according to the invention may be processed in the usual way in standard mixing units to form moldings of any kind.

The mixtures according to the invention and the moldings obtained therefrom may be used in the automotive field and in the electrical field, for example for the production of fenders and housings.

EXAMPLES

C) Components
C1) Corresponds to Example B1)
C2) Polystyrene prepared by radical polymerization of styrene in known manner, Mw (as measured by light scattering) 260,000
C3) Bisphenol-A-polycarbonate, relative viscosity $\eta_{rel}$ (as measured in $CH_2Cl_2$ at 25° C. and C=0.5 g/dl) 1.28
C4) Polymethyl methacrylate
C5) Polycaprolactam, relative solution viscosity 3.0 (as measured on a 0.5% by weight solution in m-cresol)
C6) Polyethylene terephthalate
D) Mixtures
D1) 37 g of C1) and 37 g C2) were each dissolved in 200 ml methylene chloride. The solutions were then combined, the solvent was partly removed in vacuo to leave a thickened solution from which 200 μm thick films were produced on a film drawing bench. Six pieces of this film were laid one on top of the other and pressed in air for 5 minutes at 270° C. under a pressure of 200 bar to form a rectangular laminate having a thickness of 1.042 mm.
D2) 30 g C1) and 30 g C3) were each dissolved in 200 ml methylene chloride. The solutions were then combined, the solution was thickened as in Example D1) and a 210 μm thick film was produced. Six pieces of the film were placed one on top of the other as in Example D1) and pressed in air for 5 minutes at 250° C. under a pressure of 210 bar to form a rectangular laminate having a thickness of 0.989 mm.
D3) 25 g of C1) and 25 g of C4) were each dissolved in 200 ml of methylene chloride. The solutions were then combined and the solvent partially removed in in vacuo to leave a thickened solution from which a 200 μm thick film was prepared on a film drawing bench. Six pieces of this film were placed one on top of the other and pressed in air for 5 minutes at 270° C. under a pressure of 200 bar to form a rectangular laminate having a thickness of 0.61 mm.
D4) 70 g of C5) and 30 g B1) were melted and homogenized in a flask. After the melt had cooled, the mixture was granulated and the granulate was pressed to form a 1.6 mm thick laminate in the same way as described in Example D3).
D5) 35 g C6) and 15 g B1) were pressed as described in Example D4) to form a 1.6 mm thick laminate.
E) Testing of the specimens produced in accordance with D:

The shear modulus of the test specimens was measured above room temperature using a Brabender type 802301 tortion pendulum. The test specimen was heated to the temperature shown below at a heating rate of 1 K/minute, the test specimens being subjected to a tensile load of 10 p throughout the measurement period. The torque was 1570 gcm$^2$. At modulus values below 10 Mpa, deformation of the test specimens is clearly noticeable because they no longer have sufficient internal strength.

Results:

| Example no. | Shear modulus in MPa at | | |
|---|---|---|---|
| | T = 50° C. | T = 160° C. | T = 200° C. |
| Component C2) | 1000 | <10 | <10 |
| Component C3) | 950 | <10 | <10 |
| Component C4) | 980 | <10 | <10 |
| Component C5) | 400 | 120 | 70 |
| Component C6) | 800 | 50 | 40 |
| D1) | 1000 | 80 | 65 |
| D2) | 950 | 230 | 57 |
| D3) | 1050 | 20 | — |
| D4) | 1000 | 200 | 40 |
| D5) | 950 | 180 | 80 |

German patent application P 38 40 166.5 (Le A 26 543) describes films of mixtures of the special new polycarbonates a) with other thermoplastic polycarbonates b1), the ratios by weight of a) to b1) being from 0.1% by weight: 99.9% by weight to 99.9% by weight 0.1% by weight, preferably from 5% by weight : 95% by weight to 95% by weight 5% by weight and more preferably from 10% by weight : 90% by weight to 90% by weight : 10% by weight.

It has now been found that ternary mixtures of the polycarbonates of component a) of German patent application P 38 33 953.6 (Le A 26 397), the thermoplastic polyurethanes of component b1) of German patent application P 38 33 953.6 (Le A 26 397) and the graft polymers of vinyl monomers on rubbers of component b1) of German patent application P 38 33 953.6 A 26 397) have an ideal combination of properties, namely high toughness, even at low temperatures, high heat resistance, high resistance to fuels and a rigidity variable within wide limits. Accordingly, mixtures such as these are eminently suitable for use in vehicle construction.

Accordingly the present invention relates to ternary thermoplastic mixtures containing
A) 5% by weight to 98.5% by weight, preferably 10% by weight to 93.5% by weight and more preferably 25% by weight to 84% by weight of the polycarbonates of component a) of German patent application P 38 33 953.6, B) 94.5% by weight to 1% by weight, preferably 88.5% by weight to 5% by weight and more preferably 69% by weight to 10% by weight of the thermoplastic polyurethanes of component b1) of German patent application P 38 33 953.6 and C) 0.5% by weight to 50% by weight, preferably 1.5% by weight to 45% by weight and more preferably 6% by weight to 40% by weight of the graft polymers of vinyl monomers on rubbers of component b1) of German patent application P 38 33 953.6, the sum of the percentages by weight of A)+B)+C) being 100% by weight.

The preferred polycarbonates of component A) in the ternary mixtures correspond to the preferred polycarbonates of component a) of German patent application P 38 33 953.6, in which—in the structural units of formula (Ia)—m =4 or 5 and, more especially, those bearing structural units corresponding to formula (Ic) of German patent application P 38 33 953.6, in which $R^1$ and $R^2$ are as defined for formula (Ia) and, more preferably, represent hydrogen.

The ternary mixtures according to the invention of components A)+B)+C) are prepared as described in German patent application P 38 33 953.6 (Le A 26 397) for the binary mixtures of the polycarbonates of component a) of German patent application P 38 33 953.6 with the thermoplastic polyurethanes of component b1) of German patent application P 38 33 953.6 or with the graft polymers of vinyl monomers on rubbers of component b1) of German patent application P 38 33 953.6.

The ternary mixtures according to the invention of components A)+B)+C) may be prepared simultaneously or even successively via the intermediate stages A)+B) or A) +C) or B)+C).

Accordingly, the present invention also relates to a process for the production of the mixtures according to the invention of components A)+B)+C) which is characterized in that components A), B) and C) in the quantitative ratios according to the invention are mixed simultaneously or successively either 1. as solutions in the typical solvents for components A), B) and C) and the resulting mixture is worked up in the usual way or
2. in the melt and the resulting mixture is homogenized and worked up in the usual way, for example to granulate.

The mixtures according to the invention of components B), C) and A) may contain the typical additives in the usual quantities, as already mentioned in German patent application P 38 33 953.6 (Le A 26 397) for components B), C) and A). The same applies to the timing of the incorporation of the additives and to the particular method used, as also described in German patent application P 38 33 953.6.

The mixtures according to the invention of components A)+B)+C) may be processed in known manner in standard machines, such as extruders or injection-molding machines, to form moldings of any kind, granulate, semifinished products, etc.

Suitable moldings for the mixtures of A)+B)+C) are, for example, fenders for motor vehicles.

EXAMPLE

Polycarbonates used

Example A 3,104 g (10 mol) of diphenol (II) and 1,600 g (40 mol) NaOH are dissolved with stirring in 30 l water in an inert gas atmosphere. A solution of 28.2 g (3 mol-%) phenol in 30 l methyl chloride is then added. 1,500 g (approx. 15 mol) phosgene are introduced into the thoroughly stirred solution at pH 13 to 14 and at 21 to 25° C. 10 ml N-ethyl piperidine are then added and the mixture stirred for 45 minutes. The bisphenolate-free aqueous phase is separated off and the organic phase, after acidification with phosphoric acid, is washed with water until neutral and freed from solvent. The polycarbonate has a relative solution viscosity of 1.258 as measured on a solution of 0.5 g polycarbonate in 100 ml $CH_2Cl_2$ solution at 23° C.

Example B 684 g (3 mol) 2,2-bis-(4-hydroxyphenyl)-propane (bisphenol A), 2170 g (7 mol) of diphenol (II) and 1,600 g (40 mol) NaOH are dissolved with stirring in 30 l water in an inert gas atmosphere. A solution of 23.5 g (2.5 mol-%) phenol in 30 l methyl chloride is then added. 1,500 g (approx. 15 mol-%) phosgene are introduced into the thoroughly stirred solution at pH 13 to 14 and at 21 to 25 C. 10 ml N-ethyl piperidine are then added and the mixture stirred for 45 minutes. The bisphenolate-free aqueous phase is separated off and the organic phase, after acidification with phosphoric acid, is washed with water until neutral and freed from solvent. The polycarbonate has a relative solution viscosity ($\eta_{rel}$) of 1.283.

Example C

A mixture of 1140 g (5 mol) bisphenol A and 1550 g (5 mol) diphenyl (II) was reacted to the polycarbonate as in Example B. It had a relative solution viscosity $\eta_{rel}$ of 1.291.

Example D

A mixture of 1596 g (7 mol) bisphenol A and 930 g (3 mol) diphenyl (II) was processed to polycarbonate as in Example B. It had a relative solution viscosity $\eta_{rel}$ of 1.287.

Characterization of the thermoplastic polyurethanes (TPU) used

TPU 1

TPU 1 had a melting range of approximately 200°-220° C. and a number average molecular weight ($\overline{M}_n$) of 85,700. It was synthesized from an oligoester of 1,4-butylene glycol and adipic acid ($\overline{M}_n$ 2,000), 4,4-diphenyl methane diisocyanate and butane-1,4-diol as chain extender. The ratio of NCO to OH groups was 1.03.

TPU 2

TPU 2 had a melting range of 190°-210° C. and a number average molecular weight ($\overline{M}_n$) of 79,300. It was prepared from oligobutylene glycol ($\overline{M}_n$ 1,000, OH value 112), 4,4-diphenyl methane diisocyanate and butane-1,4-diol as chain extender. The ratio of NCO to OH groups was 1.03.

Preparation of the graft polymers used a) With polybutadiene as the graft base A solution of 80 parts by weight salt-free water, 1.5 parts by weight of the sodium salt of disproportionated abietic acid and 0.3 part by weight potassium peroxydisulfate is introduced into a pressure-tight stirred vessel. After the air has been displaced by nitrogen and the internal temperature adjusted to 55° C., 0.35 part by weight dodecyl mercaptan and x part by weight butadiene are added and the mixture is polymerized. As the reaction velocity falls during the polymerization reaction, the temperature is slowly increased to 68° C. (x corresponds to the values of Table 1).

On completion of polymerization, small quantities of the unreacted butadiene are removed by thorough stirring of the latex obtained under reduced pressure. 175 Parts by weight desalted water and 0.3 part by weight potassium peroxydisulfate are added. After the air has been displaced by nitrogen and the mixture heated to 65° C., 2 parts by weight emulsifier (Na salt of disproportionated abietic acid or alkyl sulfonate) dissolved in 25 parts by weight water and y parts by weight of the monomers shown in Table 1 are added.

The inflow time is approximately 4 hours. To complete the reaction, the reaction mixture is stirred for 2 hours at 65° C. on completion of the inflow. After the addition of 1 part by weight of a phenolic antioxidant (2,6-di-tert.-butyl-p-cresol), the graft polymer latex obtained is coagulated with 2% MgSO$_4$/acetic acid solution (mixing ratio 1:1 part by weight), the coagulate is separated off, washed free from salt and dried in vacuo at 70° C. The composition of the graft polymers is shown in Table 1.

b) With polyacrylate rubber as the graft base (according to EP 134 937).

1030 Parts by weight water and 5 parts by weight of the sodium salt of $C_{14-16}$ alkyl sulfonic acids are introduced into a reactor. 80 Parts by weight solution 1 (see below) are then introduced at 70° C. Polymerization is then initiated by the addition of 5 parts by weight potassium peroxydisulfate in 100 parts by weight water. The following solutions are then added:

solution 1: 995 parts by weight n-butyl acrylate and 5 parts by weight triallyl cyanurate (80 parts by weight of this solution have already been introduced into the initial solution; the rest of the solution is added after initiation).

solution 2: 20 parts by weight sodium salts of $C_{14-18}$ alkyl sulfonic acids and 700 parts by weight water.

After the addition of solutions 1 and 2 over a period of 5 hours at 70° C., the mixture is polymerized for 4 hours at 70° C. A latex I having a solids content of 35% by weight is formed. Further processing is carried out as follows.

Initial solution 1: 12.4 parts by weight latex I and 313 parts by weight water

Initial solution 2: 0.82 part by weight potassium peroxydisulfate and 20 parts by weight water Inflow 1: 629 parts by weight n-butyl acrylate and 1 part by weight triallyl cyanurate Inflow 2: 700 parts by weight sodium salts of $C_{14-16}$ alkyl sulfonic acids Initial solution 1 is heated at 65° to 68° C. 24 Parts by weight inflow 1 are then introduced. After initiation with initial solution 2, the rest of inflow 1 and inflow 2 are added over a period of 5 hours, followed by stirring for 4 hours.

The latex II obtained has a solids content of 37% by weight. The latex particle size is 0.5 μm. The polymer has a gel content of 93% by weight, as measured in DMF at 23° C.

The grafting of methyl methacrylate onto the rubber obtained is carried out as follows:

| initial solution 1: | |
|---|---|
| latex II | 3286.4 parts by weight |

-continued

| | |
|---|---|
| potassium peroxydisulfate | 2 parts by weight |
| water | 120 parts by weight |
| inflow 1: methyl methacrylate | 304 parts by weight |
| inflow 2: sodium salts of $C_{14-16}$ | |
| alkyl sulfonic acids | 6 parts by weight |
| water | 396 parts by weight |

Initial solution 2 is introduced into initial solution 1 at 65° C. Inflow 1 and inflow 2 are then added over a period of 4 hours at 65° C. The mixture is then left to polymerize for 4 hours at 65° C. (latex III).

The graft polymer lattices are further processed as follows:

| initial solution 2: | |
|---|---|
| water | 5525 parts by weight |
| MgSO$_4$ × H$_2$O (Epsom salt) | 107 parts by weight |
| inflow 3: latex III | 379.5 parts by weight |
| inflow 4: methyl methacrylate | 156 parts by weight |
| activator: potassium peroxydisulfate | 1.3 parts by weight |
| water | 78 parts by weight |

Initial solution 2 is heated with thorough stirring at 70°–73° C. Inflow 3 is added over a period of 1 hour. Inflow 4 is then added over a period of 30 minutes, followed by activation with the activator solution. The reaction mixture is heated to 80° C., stirred for 2 hours, heated to 90 C. and then stirred for another 2 hours. After stabilization with 2 parts by weight phenolic antioxidants, the product is worked up by filtration, washing and drying to form a powder (graft polymer F).

The composition of graft polymer F is also shown in Table 1.

TABLE 1

Composition of the graft polymers

| Type | % by weight graft base | X | % by weight graft monomer | Y | Mean particle diameter (μm) |
|---|---|---|---|---|---|
| A | Polybutadiene | 80 | 20 MMA/n-BA | (9/1) | 0.4 |
| B | " | 80 | 20 S/AN (72/28) | | 0.4 |
| C | " | 80 | 20 MMA | | 0.4 |
| D | " | 70 | 30 MMA | | 0.4 |
| E | " | 80 | 20 MA | | 0.4 |
| F | acrylate rubber | 70 | 30 MMA | | 0.5 | n-BA = n-butyl acrylate
MA = methyl acrylate
S = styrene
MMA = methyl methacrylate
AN = acrylonitrile The compositions of the mixtures prepared and their properties are shown in Table 2. The mixtures were compounded in a Werner and Pfleiderer Type ZSK 32 twin-screw extruder. The maximum temperatures reached in the melt are shown in Table 2.

The Vicat softening temperature VST/B according to DIN 53 460/ISO 306 was determined as a measure of the heat resistance of the polymer mixtures.

To evaluate fuel resistance, test specimens (made by injection molding) measuring 80×10×4 mm were subjected to the jig test (W. Kaufmann, Bestimmung der Chemikalienbeständigkeit von Künststoffen unter mechanischer Spannung [Determination of Resistance of Plastics to Chemicals Under Mechanical Stressing], Kunststoffe 65 (1975), pages 155-157. Outer fiber strains of 1% were adjusted. A mixture of 50% by volume toluene, 30% by volume isooctane, 15% by volume diisobutylene and 5% by volume ethanol was used as the test liquid in accordance with DIN 51 604, Part 1. The test was carried out as follows:

1st Cycle

A cottonwool plug impregnated with the test liquid was placed on the bending jigs with the test specimens arranged thereon and left for 15 minutes. The test specimens were then left to air for 15 minutes.

2nd Cycle

Corresponds to the first cycle.

Evaluation

On completion of the second cycle, the test specimen removed from the jig is visually inspected and evaluated as follows:

| Grade | Feature |
|---|---|
| 1 | No visible change |
| 2 | Surface matted |
| 3 | Fine cracks |
| 4 | Large cracks, breakage |

Izod notched impact strength was determined in accordance with ISO 180/4 A on 63.5×12.7×3.2 mm test specimens with a notch radius of 0.25 mm.

The E modulus in tension was measured in accordance with DIN 53457 on No. 34 shoulder specimens.

A polycarbonate (PC) based on 2,2-bis-(4-hydroxyphenyl)-propane having a relative solution viscosity ($\eta_{rel}$) of 1.296, as measured at a concentration of 0.5 g in 100 ml $CH_2Cl_2$ solution at 25° C., was used for comparison tests.

A) 5 to 98.5 percent by weight of a thermoplastic polycarbonate based on diphenol corresponding to

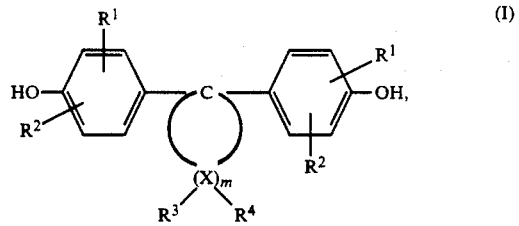

(I)

in which $R^1$ and $R^2$ independently of one another represent a member selected from the group consisting of hydrogen, halogen, $C_1$–$C_8$-alkyl, $C_5$–$C_6$ cycloalkyl, $C_6$–$C_{10}$ aryl and $C_7$–$C_{12}$ aralkyl, m is an integer of from 4 to 7, $R^3$ and $R^4$ are individually selected for each X and independently of one another represent hydrogen or $C_1$–$C_6$ alkyl and X represents carbon, with the proviso that, at at least one atom X, both $R^3$ and $R^4$ are alkyl, B) 94.5 to 1 percent by weight of a thermoplastic, substantially linear polyurethane which has been prepared from (i) at least one diisocyanate, (ii) at least one member selected from the group consisting of completely and predominantly aliphatic polyester and polyether, and (iii) at least one chain extending agent, and C) 0.5 to 50 percent by weight of a graft polymer of vinyl monomer on rubber, said percents being relative to the weight of said mixture.

TABLE 2

| Example | Poly (carbonate) type | Poly (carbonate) % by weight | TPU 1 | TPU 2 | TPU % by weight | Graft Polym. type | Graft Polym. % by weight | Compounding temp. °C. | Vicat VST/B °C. | Fuel resistance grade | Izod Notched impact strength [J/m] 23° C. | Izod Notched impact strength [J/m] −40° C. | E modulus in tension 23° C. MPa |
|---|---|---|---|---|---|---|---|---|---|---|---|---|---|
| 1* | BPA-PC | 100 | — | — | — | — | — | — | 149 | 4 | 840 | 82 | 2300 |
| 2* | BPA-PC | 75 | + | — | 25 | — | — | 250 | 137 | 2–3 | 810 | 75 | 1923 |
| 3* | BPA-PC | 65 | + | — | 25 | V | 10 | 250 | 112 | 2 | 605 | 340 | 1280 |
| 4 | A | 65 | + | — | 25 | V | 10 | 280 | 187 | 2–3 | 385 | 82 | 1387 |
| 5 | B | 65 | + | — | 25 | V | 10 | 280 | 165 | 2 | 423 | 121 | 1368 |
| 6 | C | 65 | + | — | 25 | V | 10 | 270 | 151 | 2 | 481 | 147 | 1372 |
| 7 | D | 65 | + | — | 25 | V | 10 | 260 | 131 | 2 | 532 | 173 | 1375 |
| 8 | C | 65 | + | — | 25 | I | 10 | 270 | 149 | 2 | 527 | 219 | 1284 |
| 9 | C | 65 | + | — | 25 | II | 10 | 270 | 147 | 2 | 596 | 261 | 1412 |
| 10 | C | 65 | + | — | 25 | III | 10 | 270 | 152 | 2 | 511 | 123 | 1321 |
| 11 | C | 65 | + | — | 25 | IV | 10 | 270 | 161 | 2 | 455 | 92 | 1436 |
| 12 | C | 65 | + | — | 25 | VI | 10 | 270 | 158 | 2 | 467 | 109 | 1417 |
| 13 | C | 65 | — | + | 25 | VI | 10 | 270 | 156 | 2 | 443 | 161 | 1392 |
| 14 | C | 65 | — | + | 25 | V | 10 | 270 | 150 | 2 | 472 | 173 | 1361 |
| 15 | C | 55 | + | — | 25 | V | 20 | 260 | 127 | 1–2 | 597 | 253 | 1168 |
| 16 | C | 40 | + | — | 55 | II | 5 | 260 | 113 | 1–2 | 532 | 124 | 1032 |
| 17 | C | 30 | + | — | 69 | II | 1 | 250 | 83 | 1–2 | 756 | 81 | 753 |
| 18 | C | 55 | + | — | 10 | II | 35 | 260 | 125 | 1 | 484 | 317 | 1256 |

*Comparison tests

What is claimed is:

1. A thermoplastic molding composition comprising a ternary mixture of